INVENTOR.
Idris I. Davies

Patented Sept. 19, 1950

2,523,198

UNITED STATES PATENT OFFICE 2,523,198

ELECTROPNEUMATIC CONTROL OF ATMOSPHERIC CONDITIONS

Idris Ivor Davies, Milwaukee, Wis., assignor to Johnson Service Company, Milwaukee, Wis., a corporation of Wisconsin Application February 21, 1946, Serial No. 649,246

7 Claims. (Cl. 121—41)

This invention relates to the control of temperature or humidity or other atmospheric condition.

The invention combines the rapid and precise sensing characteristics of variable resistance elements with the smoothly graduated and powerful motor action of pneumatic systems.

In addition, the invention affords compensation (to stabilize the control point and prevent hunting); adjustment of sensitivity with possible conversion from graduated action to on and off control; and ready reversibility of action to afford direct action, or alternatively reverse action.

Indeed the instrument is so adaptable and so easily adjusted that various sensitive elements such as those responsive to temperature or relative humidity may be interchanged in the same sensing circuit to produce different types of thermostat, hygrostat or other instrument. This is of great commercial importance because a single basic instrument is adaptable to a wide range of uses, by simply including a particular sensitive element and appropriate graduated scales for certain potentiometers.

While compensation has heretofore been applied to bridge circuits used as a control device, rebalancing was accomplished by one or more adjustable rheostats whose performance was uncertain because of inherent friction, and because of changes caused by wear. A feature of the present invention is a rebalancing transformer which is subject to small friction and negligible wear, and which for these and other reasons affords remarkably precise compensation. This may be incorporated in the bridge, or may be interposed between the output terminals of the bridge and the device which the bridge controls.

Another feature is the use on the pneumatic end of two relays each with leak port control, one relay being confined to admission functions and the other to exhaust functions. In this way the air end is caused to give graduated responses in reverse directions to two types of signal afforded by the sensing circuit.

Preferred embodiments of the invention will now be described by reference to the accompanying drawing, in which.

Electrical system

Figure 1:
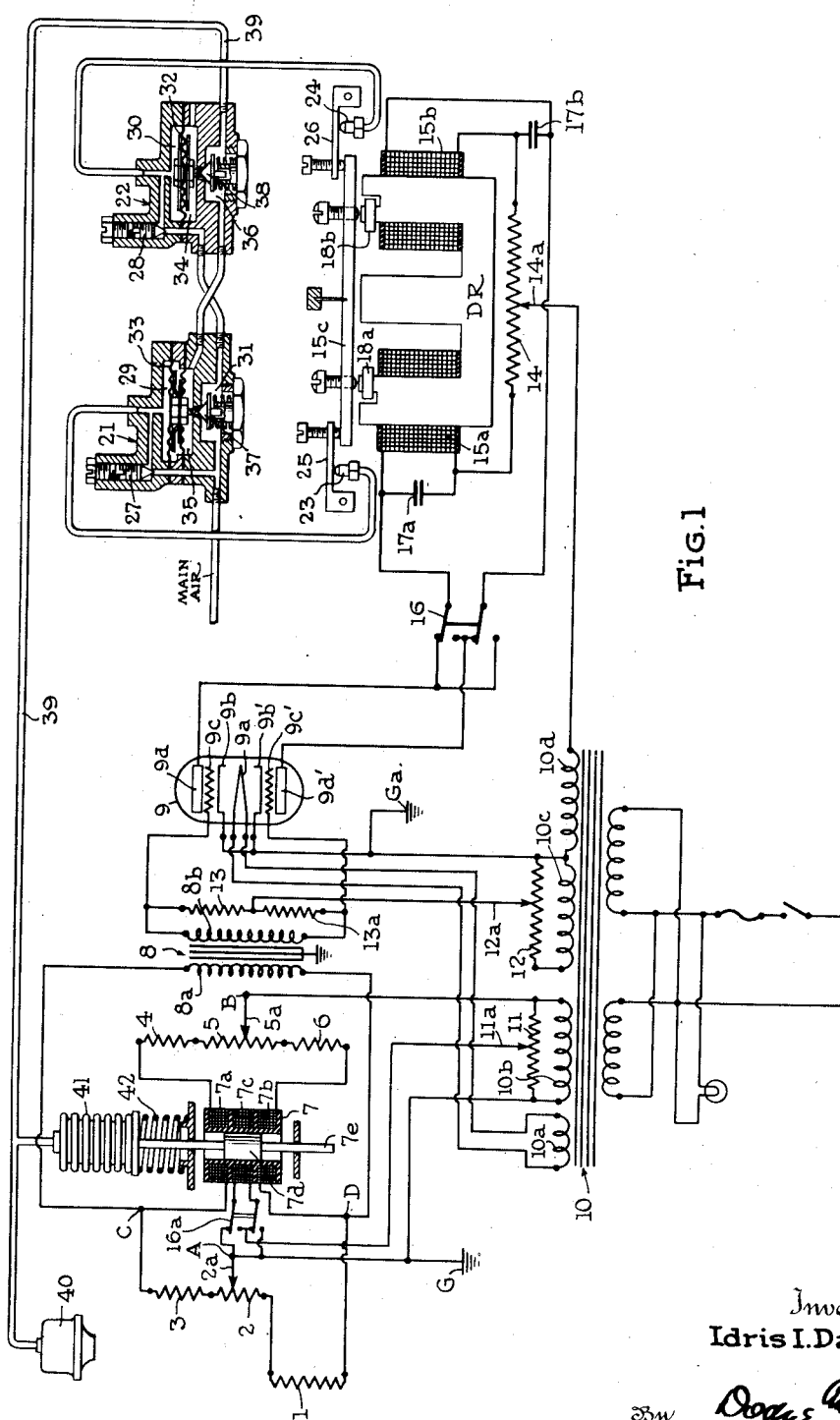
Fig. 1 is in part a diagram and in part a sectional view of the relay mechanism.

Referring to Fig. 1, the control circuit illustrated in the drawing consists of an alternating current bridge, including a balancing transformer incorporated in the bridge; a phase discriminator for sensing the direction of unbalance of the bridge on either side of the null point; a differential relay operated by the discriminator in accordance with the direction of unbalance; and a power transformer for energizing the circuit.

The sensitive element 1 is a device having electrical resistance which changes in value with changes in the condition being sensed, such as temperature or relative humidity. Such devices are known and need not be described in detail. The sensitive element 1 is connected in a bridge arrangement having a pair of input terminals A—B and a pair of output terminals C—D. One end of the element 1 is connected to the terminal D while the other end is connected to one end of a potentiometer 2 which has its other end connected through resistance 3 to terminal C. The movable contact 2a on potentiometer 2 is connected to input terminal A. Thus the arm AC of the bridge is formed of resistance 3 and the upper portion of the potentiometer 2 connected in series, while the arm AD is formed of the sensitive element 1 and the lower portion of potentiometer 2 connected in series. The arm CB of the bridge includes in serial circuit relation secondary winding 7a of a balancing transformer 7, a resistance 4 and the upper portion of potentiometer 5 which has its movable contact 5a connected to bridge terminal B. The bridge arm DB includes in serial circuit relation secondary winding 7b of the balancing transformer, resistance 6 and the lower portion of potentiometer 5. Balancing transformer 7 also includes a primary winding 7c arranged between secondary windings 7a and 7b on a non-metallic tubular support, and a magnetic core 7d mounted on a sliding rod 7e is arranged to slide axially with respect to the transformer coils. The core 7d is composed of compressed powdered iron (polyiron or the equivalent). Core 7d is shorter than the length of 7a, 7b and 7c combined and preferably it is slightly longer than the primary 7c.

The primary winding 8a of a coupling transformer 8 is connected across the output terminals C—D of the bridge, and the secondary winding 8b of this transformer is connected to the grid elements of a duo-triode vacuum tube 9. This tube is of known construction and involves a cathode heater 9a, two cathodes 9b, 9b', two grids 9c, 9c' and two plates 9d and 9d'.

A power transformer 10 energized from a suitable source of alternating current is provided with a secondary winding 10a for energizing the cathode heater 9a of the tube 9, and another secondary winding 10b energizes the bridge circuit by connections to input terminals A and B. A potentiometer 11 is connected across one of the secondary windings, for example winding 10b, and the variable contact 11a of this potentiometer is connected to one terminal of the primary winding 7c of balancing transformer 7, while the other terminal of the primary winding 7c is connected to one of the outer terminals of potentiometer 11, thus providing for variable energization of winding 7c.

Transformer 10 is provided with a secondary winding 10c to supply a biasing potential to the grids of tube 9, and another secondary winding 10d supplies current to the plate elements of the tube 9 through a divided circuit each path of which includes a coil of a differential relay. One terminal of winding 10c is connected to the cathode elements of tube 9, and this connection may also be grounded as at Ga. A potentiometer 12 is connected across winding 10c, and the variable contact 12a thereof is connected to the midpoint of a resistance path bridged across the secondary winding 8b of transformer 8 and consisting of resistance elements 13 and 13a connected in series. It will be understood that this resistance path may be eliminated, and the connection from contact 12a may be made to the mid-point of secondary winding 8b. Thus, potentiometer 12 serves to apply an adjustable biasing potential to both grids of tube 9 with respect to the cathode elements.

One terminal of secondary winding 10d is connected to the cathode lead of tube 9, and the other terminal is connected to the variable contact 14a on potentiometer 14. From this point the circuit of winding 10d divides, one half passing through the left portion of potentiometer 14, through coil 15a of differential relay DR, and through one pole of a reversing switch 16 to plate 9d of tube 9. The other circuit is completed through the right half of potentiometer 14, through relay coil 15b and through the other pole of switch 16 to plate 9d' of tube 9. Switch 16 serves to reverse the connections of the plate elements of tube 9 with respect to the coils of the differential relay DR for a purpose to be described later.

A related switch 16a is used to produce a corresponding reversal of the connection to winding 7c.

Relay coils 15a and 15b are shunted by condensers 17a and 17b to reduce chattering of the armature 15c of the relay. For the same purpose the pole pieces of the differential relay DR are slotted under the armature 15c and provided each with a shading coil 18a, 18b, comprising a ring of copper.

*Pneumatic system*

The pneumatic system is of the leak port type so arranged as to be strictly selective in action, and having a branch line in which pneumatic pressure is varied to actuate the controlled device.

When the electric system is in balance so that the armature 15c is in its mid-position the branch line pressure must be stable. The best way to assure this is to use two leak ports one of which can only increase the pressure in the branch line and the other of which can only decrease this pressure, and actuate the leak valves selectively each from a neutral position.

This requires two relays, a supply relay 21 and a discharge relay 22 having leak ports 23 and 24, respectively, with gravitating valve lids 25 and 26.

Adjusting screws, clearly shown in the drawing are provided, and the parts are so set that when armature 15c is in its mid-position both leak ports are just open wide. Displacement of the armature in opposite directions permits one or the other lid to close its leak port.

The main air connection, indicated by a legend supplies air at 15 p. s. i. gage pressure past throttle valves 27 and 28 to the pressure chambers 29 and 30 of relays 21 and 22. Main air is also supplied freely to supply chamber 31 of relay 21, which is interposed in the path to valve 28. Leak port 23 vents chamber 29 and valve 27 is so set that the chamber will be substantially completely vented when the leak port is wide open. Leak port 24 vents chamber 30 and the adjustment of valve 28 is similar.

The bottom of chamber 29 is separated by a differential flexible diaphragm 33 from the branch line chamber 35 and the bottom of chamber 30 is separated by a flexible diaphragm 32 from atmospheric chamber 34. Branch line chamber 35 in relay 21 is connected with branch line chamber 36 in relay 22. When diaphragm 33 is forced down by rising pressure in chamber 29 induced by closure of leak port 23, it opens spring closed supply poppet valve 37 and admits main air to branch line chamber 35. When diaphragm 32 is forced down by rising pressure in chamber 30 induced by closure of leak port 24 it opens spring closed exhaust poppet valve 38 and exhausts branch line chamber 36 to atmospheric chamber 34.

Since the branch line 39 is connected to chambers 35 and 36 the relays act selectively to raise and to lower branch line pressure. When both relays are inert the branch line pressure is static. The branch line leads to a spring biased pressure motor 40 connected to adjust a valve, damper or other instrumentality not shown, but used to control an atmospheric characteristic, for example, temperature, relative humidity or pressure.

Connected with the branch line 39 is a bellows motor 41 in which branch line pressure acts in opposition to spring 42. Motor 41 is connected to stem 7e and consequently shifts core 7d of the balancing transformer. The characteristics of spring 42 are such that when the motor 40 is in its mean position the line pressure then acting in motor 41 will substantially center the armature 7d.

Windings 10c and 10d must be connected so that the biasing potential applied to the grids of tube 9 from potentiometer 12 is opposite in phase with respect to the operating potential applied to the plate elements from the winding 10d. The voltage supplied by winding 10c is such that by moving the contact 12a to the extreme lefthand position, the tube 9 is biased past the cutoff point. The biasing potential may be reduced by moving the contact 12a towards the right and it reaches zero in the extreme righthand position.

As explained above, the bridge A—B—C—D is energized from winding 10b by connections to the points A—B. If the arms of the bridge are in balanced relation, no potential difference will appear between the output terminals C—D, but if sensitive element 1 has a value which causes its arm to be unbalanced with respect to the other arms, a potential difference will appear across the terminals C—D and it will have a definite phase relation with respect to the operating potential supplied to the tube 9 from the plate winding 10d. This potential difference will energize transformer 8 and impress signal potentials of opposite polarities on the grids 9c and 9c' of tube 9. Thus, one grid of tube 9 will be energized by a signal current having the same phase relation as the voltage impressed upon the plate in the same section of the tube, while the other grid will be energized by a signal current having opposite phase relation with respect to the voltage impressed on the associated plate. If the resistance value of the element 1 is now changed to establish a balanced condition in the bridge, no potential difference will appear across the output terminals C—D, and no signal potential will be impressed on the grids of tube 9. If the resistance of element 1 is now changed to unbalance the bridge in an opposite direction from the former condition of unbalance, then a potential difference will appear across terminals C—D but will be 180° out of phase with respect to the unbalance potential previously obtained, and the two signal potentials impressed on the grids 9c and 9c' will be reversed in phase.

With the bridge in balanced condition, and with potentiometer 12 adjusted to supply a biasing potential less than the cut-off value, both sections of tube 9 will conduct current during the positive alternations of the voltage supplied from winding 10d and will energize coils 15a and 15b of the differential relay DR. If the two sections of tube 9 are identical and the circuits of the two relay coils have the same characteristics, the two currents will be equal, but in actual practice it is not likely that the two sections of the tube will be identical or that the two coil circuits will be the same. The potentiometer 14 is provided for the purpose of compensating for differences in the tube sections or in the coil circuits, or both. By adjusting the contact 14a on the potentiometer, a condition of balance may be obtained in the relay DR.

Assuming a condition of balance to exist in the bridge, an increase in the resistance of element 1 will unbalance the bridge and cause signals of opposite phase relation to be applied to the grids 9c and 9c' of tube 9. In one section of the tube, the signal voltage will add to the biasing voltage supplied from potentiometer 12 and will cause a decrease in the plate current which energizes one of the windings of relay DR. In the other section of the tube, the signal voltage will be opposed to the biasing voltage supplied from potentiometer 12 and an increase in plate current will flow in this section of the tube and in the corresponding relay winding. Thus the armature 15c of relay DR will be operated in one direction. Assuming now that the resistance of element 1 changes in the opposite direction from that just stated, the resulting signals impressed on the grids of tube 9 will be reversed in phase, and the conditions of operation of the two tube sections will reverse; that is, the relay winding which formerly was energized by a low value of current will now be energized by a high value of current and the other relay winding will receive low current, with the result that the armature 15c will be operated in the reverse direction. Thus, the tube 9 serves to sense the direction of unbalance of the bridge and operates the differential relay DR accordingly.

Motion of armature 15c in one or the other direction from the mid-position shown in the drawing causes one or the other of lids 25 or 26 to close the related leak port, and thus through operation of related relay 21 or 22 cause pressure in branch line 39 to rise or fall. The motor 40 responds to this change of pressure and actuates some device, such as a heater, cooler or humidity or pressure controller to correct the condition affecting element 1.

The foregoing description of operation disregards the function of the balancing transformer 7. This transformer is provided for the purpose of introducing balancing voltages into two arms of the bridge for the purpose of re-establishing a balanced condition in response to changes in a condition being controlled, or more specifically, in response to the regulatory pressure in branch line 39.

With the movable core 7d positioned at the center of the transformer, equal voltages are induced in the secondary windings 7a and 7b from the primary winding 7c, and these windings are connected in the bridge circuit in such direction that these voltages are opposed to each other with respect to the output terminals C—D. Accordingly, with the core in its central position, the balancing transformer will not affect the operation of the system which is as described above. It will be understood that windings 7a and 7b are formed of an equal number of turns and are preferably formed of a small number of turns such that the inductance of these windings has no appreciable effect upon the phase relation of the currents in the arms of the bridge.

If the core 7d is moved away from its central position so that it extends into one secondary winding to a greater extent than into the other, the voltage induced in the first secondary winding will be greater than in the second, and a potential difference will appear across the terminals C—D. If the core is moved away from its central position in the opposite direction, the potential difference appearing across the terminal C—D will be of opposite phase. Thus, if the bridge arms are unbalanced with respect to current supplied across the input terminals A—B, in consequence of a change sensed by element 1, a condition of balance may be re-established by moving the core 7d in a direction such that the voltage supplied from the balancing transformer 7 will oppose and neutralize the output voltage due to the unbalance of the bridge. By properly connecting the core 7d to be moved in response to a change of branch line pressure, the balancing transformer 7 will function as compensating means.

The sensitivity of the balancing transformer 7 is significant as to the degree and character of this compensation and is controlled by adjustment of the potentiometer 11 which energizes the primary winding 7c. By moving the contact 11a to the lefthand position, the energizing current is reduced to zero, and the sensitivity of the transformer is also reduced to zero. When the contact 11a is moved to the right, the sensitivity of the balancing transformer is increased and in proportion to the current supplied to the primary winding 7c. Stated differently, the greater the current supplied to the winding 7c, the greater will be the resulting counterbalancing voltage supplied by the transformer 7 for a given movement of the core 7d from its center position.

Adjustment of the value of the condition to be maintained is secured by adjusting the position of the contact 5a on potentiometer 5 which determines the amount of unbalance of the bridge with respect to the input terminals A—B. Potentiometer 5 may be provided with a scale calibrated in terms of temperature, humidity or other terms. Compensation for various lengths of line connecting element 1 with the bridge circuit may be obtained by adjusting the contact 2a on potentiometer 2. If a type of sensitive element 1 characterized by a large change of resistance in response to a small change of the condition sensed is employed, resistors 4 and 6 will not be required. The line balancing contact 2a on potentiometer 2 could then also be eliminated, since the line resistance would be negligible with respect to the resistance change occurring in the element 1. Resistors 4, 6, and potentiometer 2 will be required where element 1 has a low temperature coefficient of resistivity. However, resistance units which are characterized by a high change of resistance in response to a small change of temperature are well known in the art.

Potentiometer 12 provides an adjustment of the differential response of the system. By decreasing the biasing potential to zero, only a small change in the controlled condition is required for changing the bridge from one condition of unbalance to an opposite condition of unbalance, and the null interval will be very short and will not enter into the control cycle. With a comparatively large biasing potential applied to the grids of tube 9, a greater change in the condition being controlled is required to overcome this biasing potential to produce operation of the differential relay in one direction or the other; the null interval is greatly lengthened, and there is a greater difference in the value of the condition required for operating relay DR in one direction than that required for operating the relay in the opposite direction.

Reversing switches 16 and 16a are provided to adapt the system for direct or reverse operation. That is to say, they reverse the direction in which pressure in branch line 39 changes in response to a change of condition affecting resistance element 1. The two switches could be mechanically connected to operate in unison.

In practice of the invention it is desirable to ground one point of the bridge, for example, terminal A may be grounded as at G, and it is also desirable to ground the cathodes of tube 9 as at Ga. These two grounded sections of the circuit are electrically isolated from each other by the transformer 8.

It will be observed that in Fig. 1 the rebalancing transformer is incorporated in the bridge and actually rebalances the bridge proper. An equivalent effect can be had by interposing a rebalancing transformer between the output terminals of the bridge and the coupling transformer. To illustrate this possibility and for the purpose of illustrating a different form of rebalancing transformer, Fig. 2 has been included.

Figure 2:
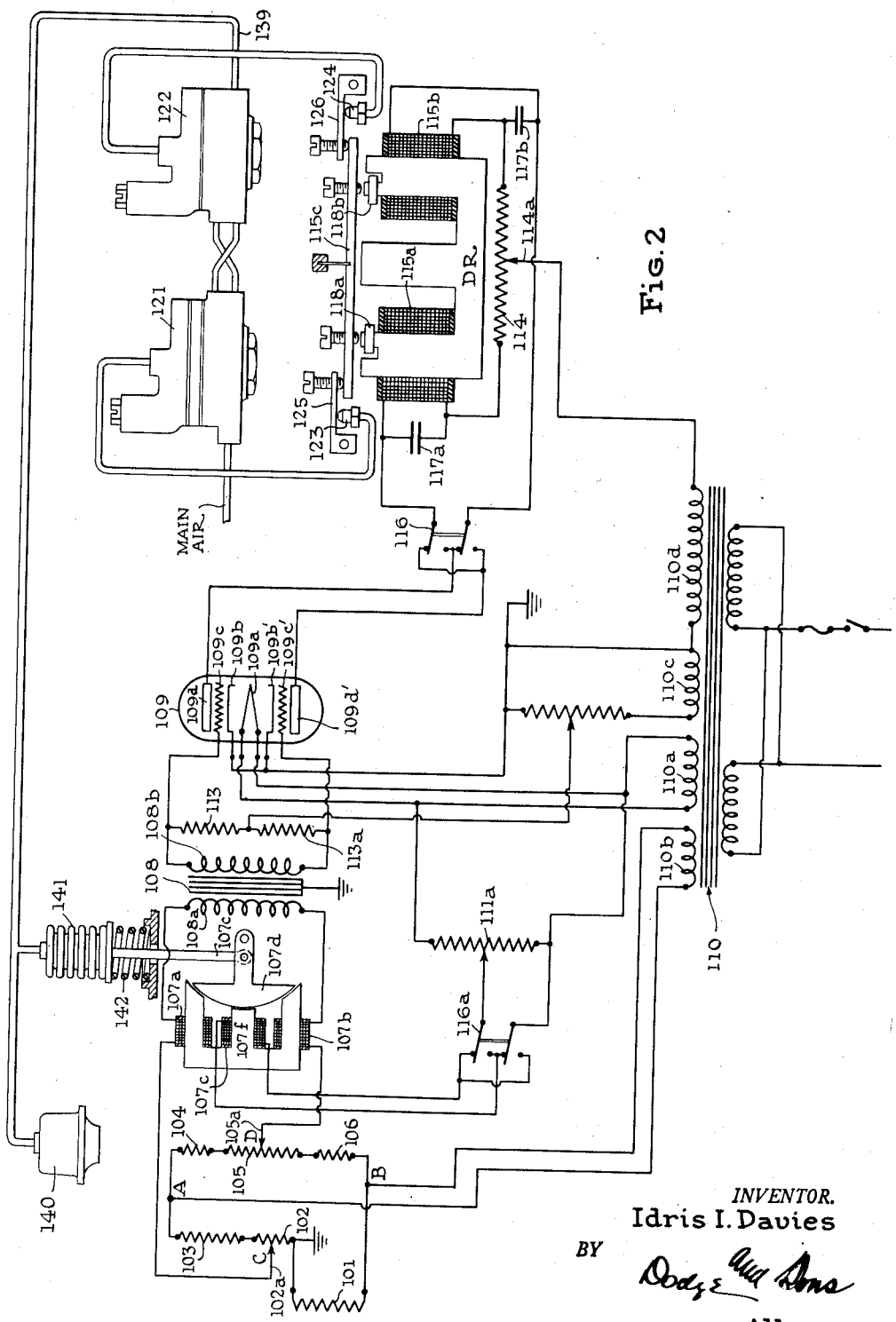
Fig. 2 is a similar view illustrating a modification.

Modification illustrated in Fig. 2

In this view parts that generally correspond with parts on Fig. 1 are given the same reference numeral increased by one hundred.

In Fig. 2 A and B represent the input terminals of the bridge and C and D the output terminals thereof. Examination of the circuit will indicate that basically it is similar to the original circuit, but the windings 107a and 107b of the balancing (off null) transformer are not included in the bridge proper but are interposed between the output terminals C and D and the primary 108a of the coupling transformer.

The function of these windings is to cancel the effect of unbalance of the bridge as contradistinguished from what might be described as rebalancing the bridge itself. The rebalancing transformer includes a core 107f comprising a stack of thin silicon steel laminations. The moving core 107d is composed of similar laminations and is pivoted to swing around the fulcrum under the influence of the bellows motor 141. The clearance between the member 107d and the core 107f is small, being about .004".

The primary winding 107c is on the center arm of the core and windings 107a and 107b are on the end arms of the core. The primary winding 107c obtains its current from the vacuum tube heater winding 110a under the control of potentiometer 111a.

The reversing switch 116a is provided for the same purpose as switch 16a of Fig. 1. When the moving core 107d is in its midposition the reluctance of the magnetic circuit coupling secondary 107a to primary 107c is equal to the reluctance of the magnetic circuit coupling secondary 107b to primary 107c. Consequently, the currents induced in the secondary coils are equal. Since the secondary coils are connected in series in the output circuit of the bridge, and since they are reversed in phase with respect to one another, they will introduce no rebalancing effect in the output circuit of the bridge when core 107d is in its centered or normal position. If the core is moved away from its centered position in one or another direction, the differential current will be caused to flow in the output circuit of the bridge and its phase will reverse as the moving core 107d crosses its normal position. The magnitude of the current will vary according to the displacement of member 107d from its normal midposition. The remainder of the circuit conforms to the showing in Fig. 1 and requires no detailed discussion.

Two embodiments of the invention have been described in considerable detail in order to emphasize the versatility of the rebalancing transformer which may take different forms and which may be variously connected with the bridge circuit. Consequently, modifications within the broad scope of the claims are possible and are contemplated.

What is claimed is:

1. The combination of an alternating current bridge, including an element responsive to a condition to be sensed arranged to unbalance the bridge in opposite phases upon departure of said condition in opposite directions from a predetermined normal value; a phase-discriminator comprising at least one electron tube arranged to respond selectively to opposite departures of said bridge from balance; a motor responsive to a variable pressure and adapted to control the sensed condition; a source of pressure fluid; electrically operated valve means controlled by said phase discriminator and arranged to connect said motor selectively with said source and with exhaust; and means for neutralizing an unbalanced condition of said bridge, said means comprising an adjustable transformer having a shiftable armature, and an independent motor subject to the pressure in the first named motor and connected to shift said armature.

2. The combination of an alternating current bridge, including an element responsive to a condition to be sensed arranged to unbalance the bridge in opposite phases upon departure of said condition in opposite directions from a predetermined normal value; a phase-discriminator comprising at least one electron tube arranged to respond selectively to opposite departures of said bridge from balance; a motor responsive to a variable pressure and adapted to control the sensed condition; a source of pressure fluid; electrically operated valve means controlled by said phase discriminator and arranged to connect said motor selectively with said source and with exhaust; an adjustable transformer forming part of said bridge and adjustable to rebalance the same; and motor means responsive to the pressure in the first named motor to adjust the transformer to effect rebalance of the bridge.

3. The combination of a bridge having four arms connected between a pair of input terminals and a pair of output terminals; a source of alternating current connected to said input terminals; an element responsive to a condition to be sensed connected in one arm of said bridge; a phase discriminator connected to the output terminals of said bridge for sensing unbalance of said bridge in opposite directions; motor means for controlling the magnitude of the condition being sensed; means controlled by said phase discriminator for energizing said motor means to increase or decrease said condition according to the unbalance of said bridge; transformer means for normally inducing alternating current voltages of opposite phase into two arms of said bridge connected in series across said output terminals; and movable means controlled in accordance with the energization of said motor for varying the magnitudes of said induced voltages in opposite directions.

4. A combination according to claim 3 wherein said transformer means comprises a transformer having a primary winding energized from said source of alternating current and two secondary windings arranged on opposite sides of said primary winding and connected in said two arms of said bridge, and a movable magnetic core for varying the coupling between said primary winding and said two secondary windings in opposite directions.

5. The combination of a bridge having four arms connected between a pair of input terminals and a pair of output terminals; a source of alternating current connected to said input terminals; an element responsive to a condition to be sensed connected in one arm of said bridge; a phase discriminator connected to the output terminals of said bridge for sensing unbalance of said bridge in opposite directions; motor means for controlling the magnitude of the condition being sensed; means controlled by said phase discriminator for energizing said motor means to increase or decrease said condition according to the unbalance of said bridge; transformer means for normally inducing alternating current voltages of opposite phase into two arms of said bridge connected in series across said output terminals; adjustable means for varying the energization of the primary winding of said transformer means; and movable means controlled in accordance with the energization of said motor for varying the magnitudes of said induced voltages in opposite directions.

6. The combination of a bridge having four arms connected between a pair of input terminals and a pair of output terminals; a source of alternating current connected to said input terminals; an element responsive to a condition to be sensed connected in one arm of said bridge; a phase discriminator connected to the output terminals of said bridge for sensing unbalance of said bridge in opposite directions; motor means for controlling the magnitude of the condition being sensed; means controlled by said phase discriminator for energizing said motor means to increase or decrease said condition according to the unbalance of said bridge; transformer means for normally inducing alternating current voltages of opposite phase connected in series in the circuit which connects the output terminals of said bridge with the phase discriminator; adjustable means for varying the energization of the primary winding of said transformer means; and movable means controlled in accordance with the energization of said motor for varying the magnitudes of said induced voltages in opposite directions.

7. The combination of a bridge having four arms connected between a pair of input terminals and a pair of output terminals; a source of alternating current connected to said input terminals; an element responsive to a condition to be sensed connected in one arm of said bridge; a phase discriminator connected to the output terminals of said bridge for sensing unbalance of said bridge in opposite directions; motor means for controlling the magnitude of the condition being sensed; means controlled by said phase discriminator for energizing said motor means to increase or decrease said condition according to the unbalance of said bridge; transformer means for normally inducing alternating current voltages of opposite phase in the output circuit of said bridge; adjustable means for varying the energization of the primary winding of said transformer means; and movable means controlled in accordance with the energization of said motor for varying the magnitudes of said induced voltages in opposite directions.

IDRIS IVOR DAVIES.

REFERENCES CITED

The following references are of record in the file of this patent:

UNITED STATES PATENTS

| Number | Name | Date |
| --- | --- | --- |
| 788,278 | Porter | Apr. 25, 1905 |
| 2,080,212 | Otto | May 11, 1937 |
| 2,262,173 | Fischer | Nov. 11, 1941 |
| 2,358,103 | Rydner | Sept. 12, 1944 |
| 2,363,690 | Razek | Nov. 28, 1944 |
| 2,390,425 | Crum | Dec. 4, 1945 |
| 2,403,917 | Gille | July 16, 1946 |
| 2,430,757 | Conrad | Nov. 11, 1947 |